United States Patent
Zhang et al.

(10) Patent No.: US 12,408,059 B2
(45) Date of Patent: Sep. 2, 2025

(54) CROSS-LINK INTERFERENCE INFORMATION EXCHANGE

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/934,397

(22) Filed: Sep. 22, 2022

(65) Prior Publication Data

US 2024/0107351 A1 Mar. 28, 2024

(51) Int. Cl.
*H04W 24/10* (2009.01)
*H04W 72/12* (2023.01)

(52) U.S. Cl.
CPC .......... *H04W 24/10* (2013.01); *H04W 72/12* (2013.01)

(58) Field of Classification Search
None
See application file for complete search history.

(56) References Cited

U.S. PATENT DOCUMENTS

| | | | | |
|---|---|---|---|---|
| 2022/0116129 A1* | 4/2022 | Ying | .................... | H04B 7/0617 |
| 2022/0159662 A1* | 5/2022 | Li | ......................... | H04L 5/0051 |
| 2022/0263641 A1* | 8/2022 | Xie | ........................ | H04L 5/0091 |
| 2023/0189315 A1* | 6/2023 | Haustein | ............... | H04W 24/02 |
| | | | | 370/252 |
| 2023/0189382 A1* | 6/2023 | Haustein | ............... | H04W 76/20 |
| | | | | 370/329 |
| 2023/0300653 A1* | 9/2023 | Ren | ....................... | G01S 13/765 |
| | | | | 370/329 |
| 2023/0319605 A1* | 10/2023 | Park | ........................ | H04L 5/00 |
| | | | | 370/252 |
| 2024/0107351 A1* | 3/2024 | Zhang | ................... | H04W 24/08 |

FOREIGN PATENT DOCUMENTS

| WO | 2018223386 A1 | 12/2018 |
|---|---|---|
| WO | 2022029196 A1 | 2/2022 |
| WO | 2022029197 A1 | 2/2022 |
| WO | 2022041130 A1 | 3/2022 |
| WO | 2022056903 A1 | 3/2022 |

OTHER PUBLICATIONS

International Search Report and Written Opinion—PCT/US2023/070694—ISA/EPO—Oct. 30, 2023.

\* cited by examiner

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a network node may receive, from a user equipment (UE), a cross-link interference (CLI) report. The network node may transmit, to a second network node and based at least in part on the CLI report, CLI information indicating CLI associated with the UE. Numerous other aspects are described.

32 Claims, 12 Drawing Sheets

CROSS-LINK INTERFERENCE INFORMATION EXCHANGE

FIELD OF THE DISCLOSURE

Aspects of the present disclosure generally relate to wireless communication and to techniques and apparatuses for cross-link interference information exchange.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a first network node. The method may include receiving, from a user equipment (UE), a cross-link interference (CLI) report. The method may include transmitting, to a second network node and based at least in part on the CLI report, CLI information indicating CLI associated with the UE.

Some aspects described herein relate to a method of wireless communication performed by an apparatus of a first network node. The method may include receiving, from a second network node, CLI information indicating CLI associated with a UE. The method may include configuring communications with one or more other UEs based at least in part on the CLI information.

Some aspects described herein relate to a method of wireless communication performed by an apparatus of a UE. The method may include receiving, from a network node, information indicating a time window associated with measurement of at least one CLI reference signal. The method may include receiving the at least one CLI reference signal. The method may include transmitting, to the network node, information indicating a time difference between the time window and receipt of the at least one CLI reference signal.

Some aspects described herein relate to a network node for wireless communication. The network node may include a memory and one or more processors coupled to the memory. The one or more processors may be configured to receive, from a UE, a CLI report. The one or more processors may be configured to transmit, to a second network node and based at least in part on the CLI report, CLI information indicating CLI associated with the UE.

Some aspects described herein relate to a network node for wireless communication. The network node may include a memory and one or more processors coupled to the memory. The one or more processors may be configured to receive, from a second network node, CLI information indicating CLI associated with a UE. The one or more processors may be configured to configure communications with one or more other UEs based at least in part on the CLI information.

Some aspects described herein relate to a UE for wireless communication. The UE may include a memory and one or more processors coupled to the memory. The one or more processors may be configured to receive, from a network node, information indicating a time window associated with measurement of at least one CLI reference signal. The one or more processors may be configured to receive the at least one CLI reference signal. The one or more processors may be configured to transmit, to the network node, information indicating a time difference between the time window and receipt of the at least one CLI reference signal.

Some aspects described herein relate to a non-transitory computer-readable medium that stores a set of instructions for wireless communication by a network node. The set of instructions, when executed by one or more processors of the network node, may cause the network node to receive, from a UE, a CLI report. The set of instructions, when executed by one or more processors of the network node, may cause the network node to transmit, to a second network node and based at least in part on the CLI report, CLI information indicating CLI associated with the UE.

Some aspects described herein relate to a non-transitory computer-readable medium that stores a set of instructions for wireless communication by a network node. The set of instructions, when executed by one or more processors of the network node, may cause the network node to receive, from a second network node, CLI information indicating CLI associated with a UE. The set of instructions, when executed by one or more processors of the network node, may cause the network node to configure communications with one or more other UEs based at least in part on the CLI information.

Some aspects described herein relate to a non-transitory computer-readable medium that stores a set of instructions for wireless communication by UE. The set of instructions, when executed by one or more processors of the UE, may cause the UE to receive, from a network node, information indicating a time window associated with measurement of at least one CLI reference signal. The set of instructions, when executed by one or more processors of the UE, may cause the UE to receive the at least one CLI reference signal. The set of instructions, when executed by one or more processors of the UE, may cause the UE to transmit, to the network node, information indicating a time difference between the time window and receipt of the at least one CLI reference signal.

Some aspects described herein relate to an apparatus for wireless communication. The apparatus may include means for receiving, from a UE, a CLI report. The apparatus may include means for transmitting, to a second network node and based at least in part on the CLI report, CLI information indicating CLI associated with the UE.

Some aspects described herein relate to an apparatus for wireless communication. The apparatus may include means for receiving, from a second network node, CLI information indicating CLI associated with a UE. The apparatus may include means for configuring communications with one or more other UEs based at least in part on the CLI information.

Some aspects described herein relate to an apparatus for wireless communication. The apparatus may include means for receiving, from a network node, information indicating a time window associated with measurement of at least one CLI reference signal. The apparatus may include means for receiving the at least one CLI reference signal. The apparatus may include means for transmitting, to the network node, information indicating a time difference between the time window and receipt of the at least one CLI reference signal.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
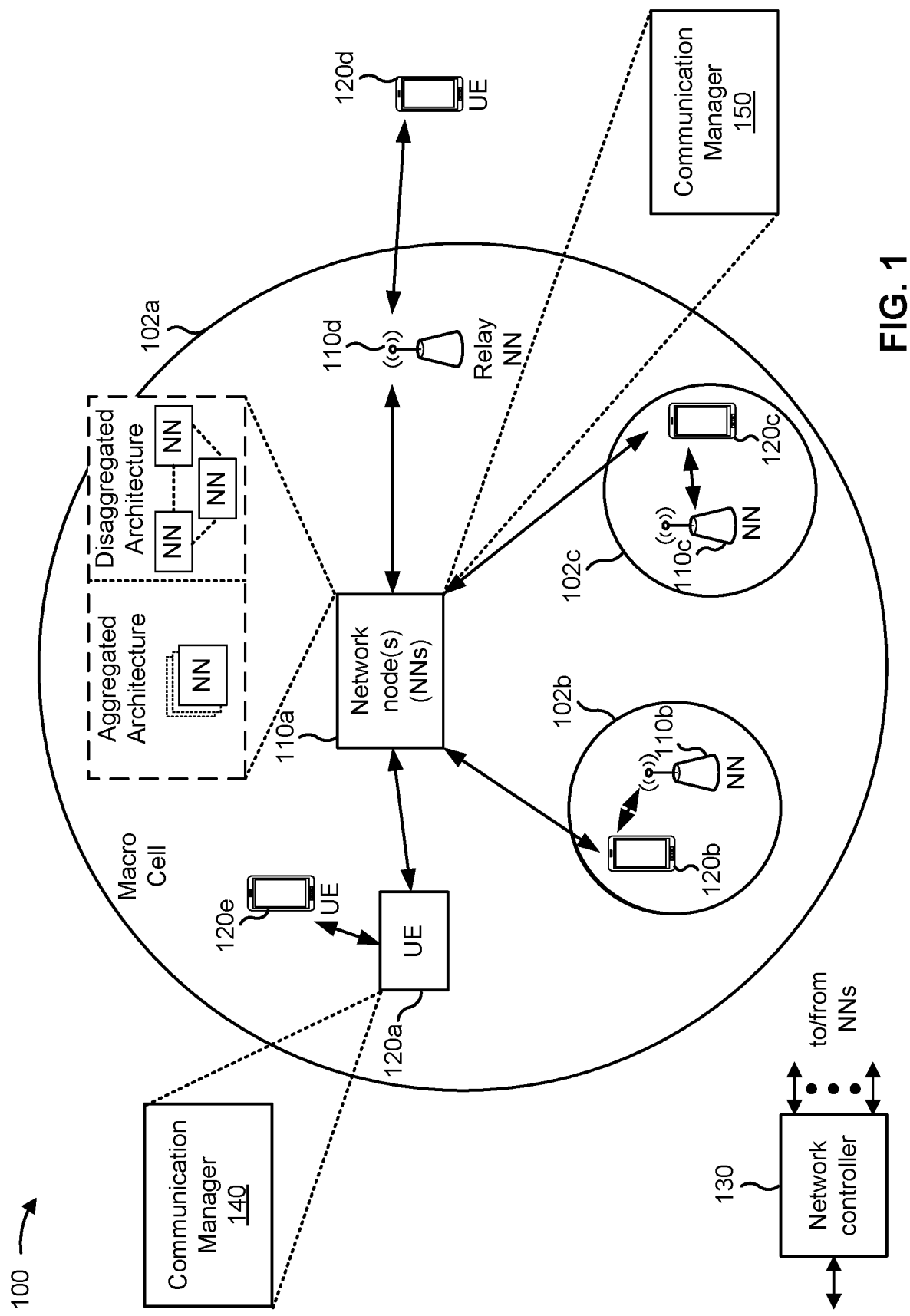
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may receive, from a UE, a cross-link interference (CLI) report; and transmit, to a second network node and based at least in part on the CLI report, CLI information indicating CLI associated with the UE. In some aspects, the communication manager 150 may receive, from a second network node, CLI information indicating CLI associated with a UE; and configure communications with one or more other UEs based at least in part on the CLI information. Additionally, or alternatively, the communication manager 150 may perform one or more other operations described herein.

In some aspects, the UE 120 may include a communication manager 140. As described in more detail elsewhere herein, the communication manager 140 may receive, from a network node, information indicating a time window associated with measurement of at least one CLI reference signal; receive the at least one CLI reference signal; and transmit, to the network node, information indicating a time difference between the time window and receipt of the at least one CLI reference signal. Additionally, or alternatively, the communication manager 140 may perform one or more other operations described herein.

As indicated above, FIG. 1 is provided as an example. Other examples may differ from what is described with regard to FIG. 1.

Figure 2:
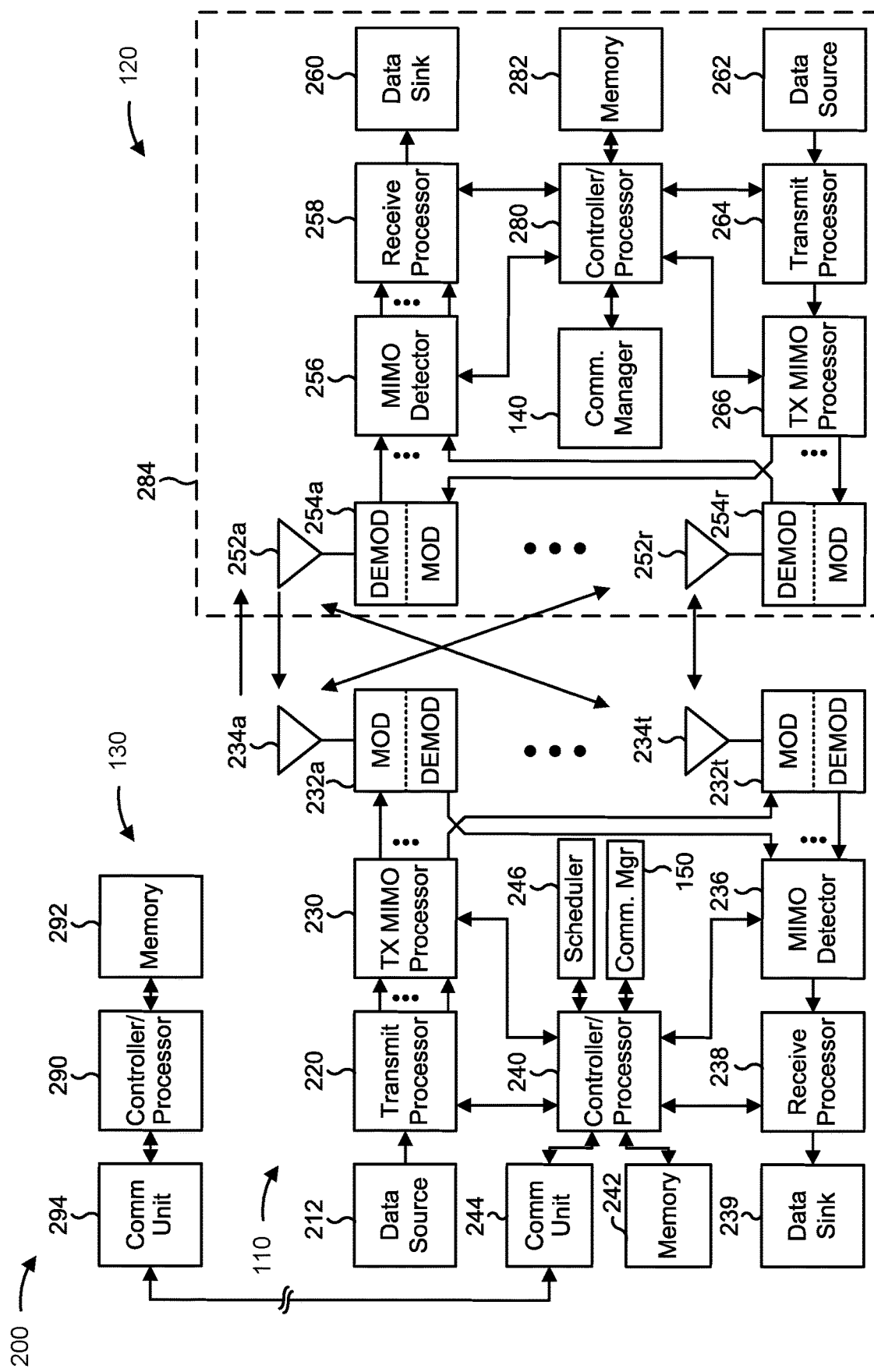
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with exchanging CLI information, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the network node 110 includes means for receiving, from a UE, a CLI report; and/or means for transmitting, to a second network node and based at least in part on the CLI report, CLI information indicating CLI associated with the UE. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node 110 includes means for receiving, from a second network node, CLI information indicating CLI associated with a UE; and/or means for configuring communications with one or more other UEs based at least in part on the CLI information. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving, from a network node, information indicating a time window associated with measurement of at least one CLI reference signal; means for receiving the at least one CLI reference signal; and/or means for transmitting, to the network node, information indicating a time difference between the time window and receipt of the at least one CLI reference signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
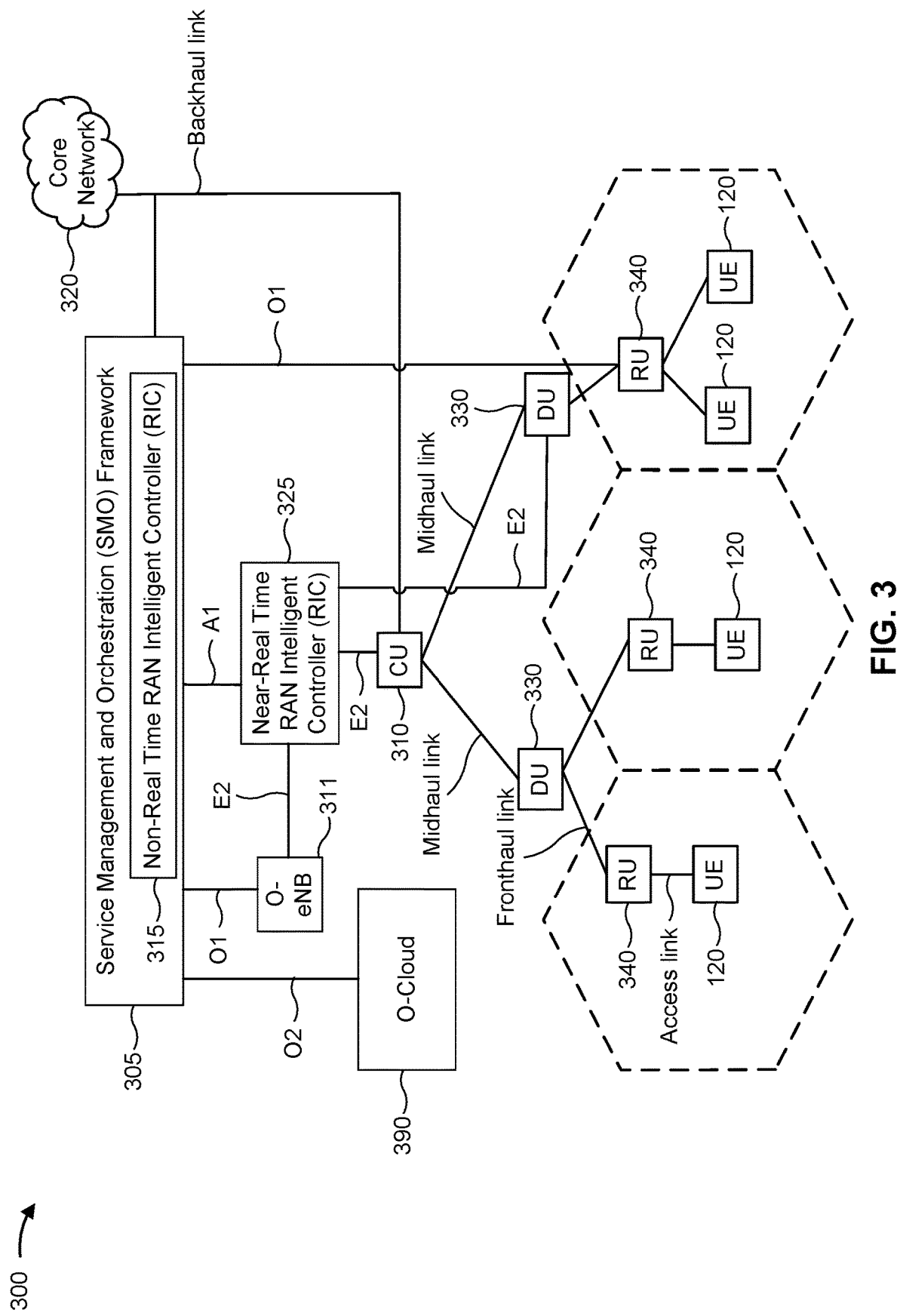
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT MC 325 via an E2 link, or a Non-RT MC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
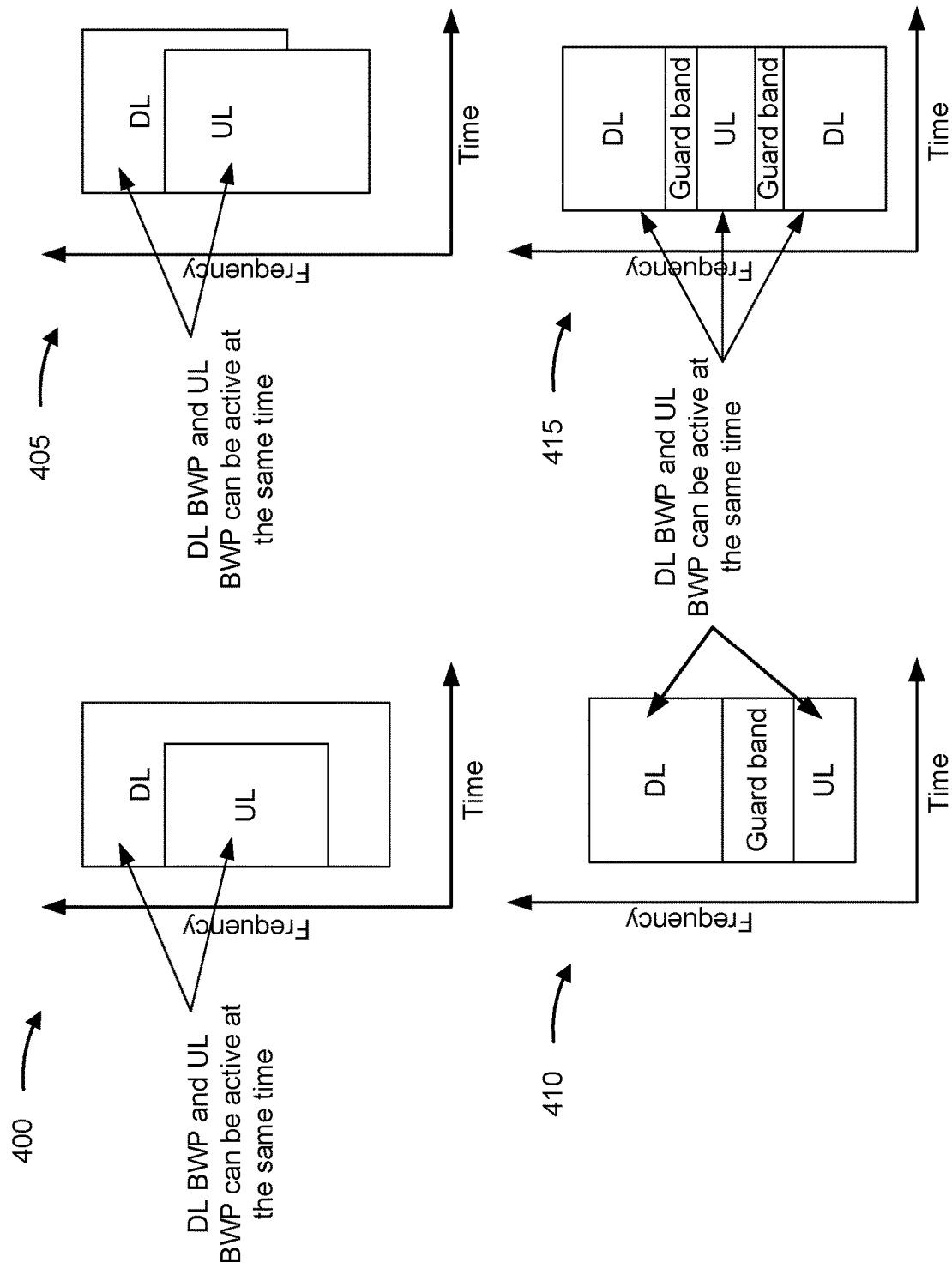
FIG. 4 is a diagram illustrating examples of full-duplex communication in a wireless network, in accordance with the present disclosure.

FIG. 4 is a diagram illustrating examples 400, 405, 410, and 415 of full-duplex communication in a wireless network, in accordance with the present disclosure. "Full-duplex communication" in a wireless network refers to simultaneous bi-directional communication between devices in the wireless network. For example, a UE or network node operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol). Half-duplex communication may be performed, for example, using frequency division duplexing (FDD) and/or time-division duplexing (TDD). In FDD mode, for example, a UE may use a first frequency region (or channel) for uplink communication and a second frequency region (or channel) for downlink communication at the same time (e.g., in a same frame, slot, and/or symbol). In TDD mode, a UE may transmit uplink communications and receive downlink communications in a single frequency region, but at different time intervals (e.g., frames, slots, and/or symbols).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, examples 410 and 415 show examples of sub-band full-duplex (SBFD) communications, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by one or more guard bands.

As indicated above, FIG. 4 is provided as an example. Other examples may differ from what is described with respect to FIG. 4.

Figure 5A:
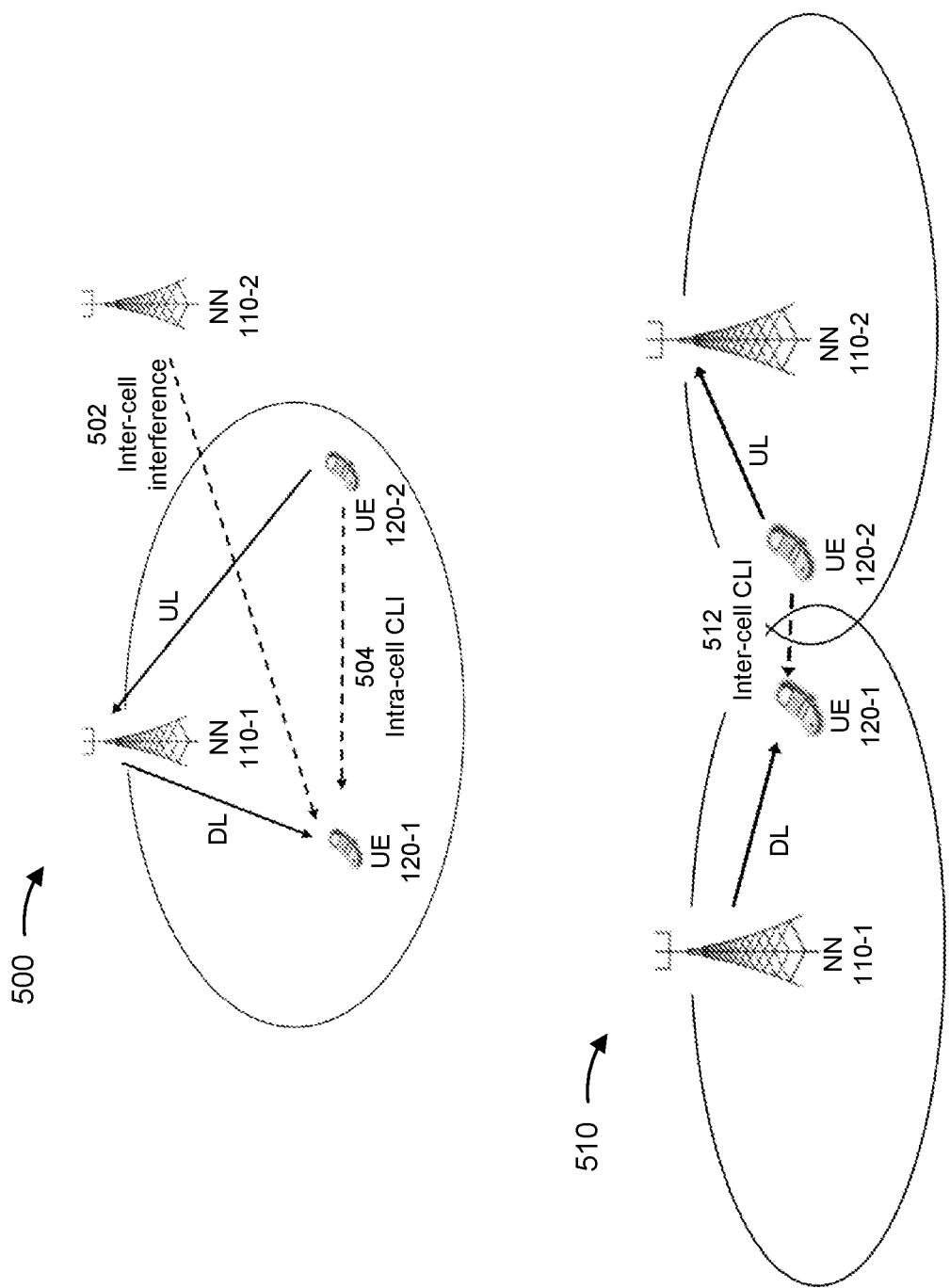
FIGS. 5A-5B are diagrams illustrating examples of cross-link interference (CLI) that may be experienced by a UE.
Figure 5B:
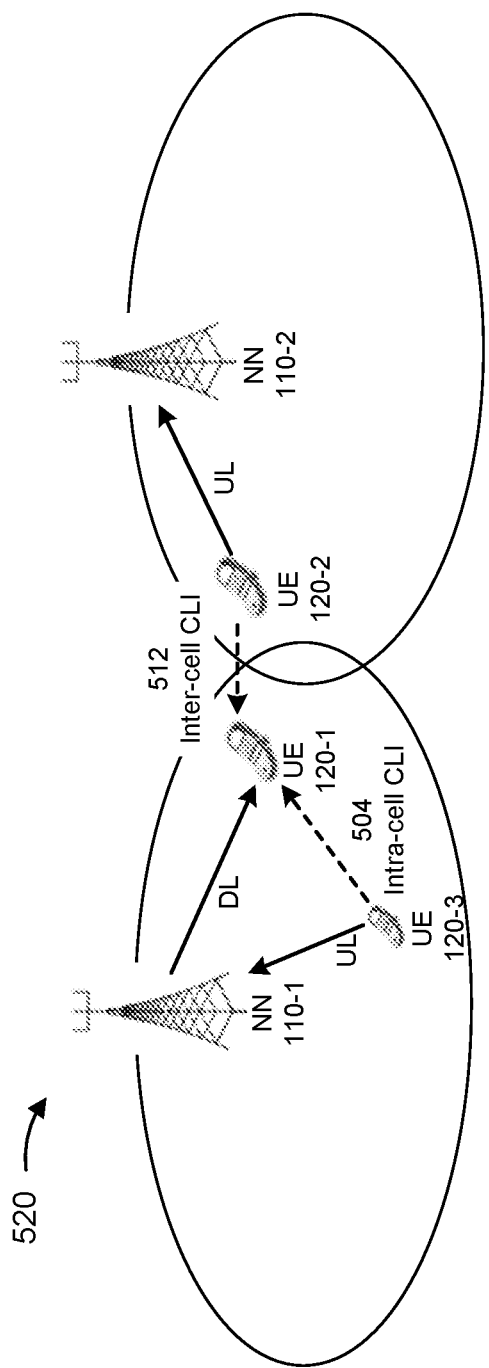

FIGS. 5A-5B are diagrams illustrating examples 500, 510, 520 of cross-link interference (CLI) that may be experienced by a UE. For example, a UE may experience interference that causes degraded reception performance in various scenarios. For example, a first UE (e.g., UE 120-1) receiving one or more downlink transmissions from a network node (e.g., network node 110-1) may experience inter-cell CLI caused by downlink transmissions from nearby network nodes in different cells (e.g., network node 110-2), intra-cell CLI caused by uplink transmissions from other UEs (e.g., UE 120-2) in the same cell (e.g., when a network node communicating with the other UE is operating in an IBFD mode or an SBFD mode), and/or inter-cell CLI caused by uplink transmissions from other UEs in adjacent cells. For example, the CLI may be experienced at the first UE when transmissions from nearby network nodes and/or nearby UEs are received at the first UE, which may interfere with reception of the desired downlink transmission(s) at the first UE. Furthermore, in cases where the first UE is configured to operate in a full-duplexing mode (e.g., supporting concurrent or simultaneous uplink transmission and downlink reception), the first UE may experience self-interference due to the uplink transmission leaking into a receive port and/or an object in an environment surrounding the first UE reflecting the uplink transmission back to the receive port.

For example, as shown in FIG. 5A, example 500 includes a first UE (e.g., UE 120-1) operating in a half-duplexing mode and communicating with a first network node (e.g., network node 110-1) operating in an IBFD or SBFD mode. For example, as shown by example 500, the first network node may be operating in the IBFD or SBFD mode to support concurrent downlink transmission to the first UE and uplink reception from a second UE (e.g., UE 120-2). In example 500 a first source of interference at the first UE may be inter-cell CLI 502 caused by downlink transmissions performed by a second network node (e.g., network node 110-2) in a nearby or adjacent cell. Furthermore, as shown at 504, a second source of interference at the first UE may be intra-cell CLI caused by the uplink transmission from the second UE.

As further shown in FIG. 5A, in example 510, the first UE (e.g., UE 120-1) may be operating in a half-duplexing mode and communicating with a first network node (e.g., network node 110-1) operating in a half-duplexing mode. In this case, however, a second UE (e.g., UE 120-2) may be communicating with a second network node (e.g., network node 110-2) in an adjacent cell. In some cases, uplink transmissions in one cell may occur during the same transmission time interval as a downlink transmission in another cell, resulting in inter-cell CLI. For example, as shown at 512, the first UE may receive a downlink transmission from the first network node, and the second UE may concurrently transmit an uplink transmission to the second network node, which may cause CLI interfering with downlink reception at the first UE.

Additionally, or alternatively, as shown in FIG. 5B, in example 520, the first UE (e.g., UE 120-1) may experience both intra-cell CLI 504 and inter-cell CLI 512 when in communication with a first network node (e.g., network node 110-1). For example, the second UE (e.g., UE 120-2) may cause inter-cell CLI 512 by transmitting an uplink communication to a second network node (e.g., network node 110-2) concurrently with the first UE receiving a downlink communication from the first network node. In addition, a third UE (e.g., UE 120-3) may cause intra-cell CLI 504 by transmitting an uplink communication to the first network node concurrently with the first UE receiving the downlink communication from the first network node.

As indicated above, FIGS. 5A-5B are provided as examples. Other examples may differ from what is described with regard to FIGS. 5A-5B.

As described above, there are various scenarios in which a UE may experience inter-cell CLI, intra-cell CLI, self-interference, and/or other interference that may degrade downlink reception performance at the UE. Accordingly, a network node may configure the UE to obtain measurements related to the interference experienced at the UE and to report the measurements to the network node (e.g., to enable the network node to select an appropriate downlink beam, resource allocation, and/or other communication parameters to mitigate the interference experienced at the UE). For example, a network node may configure the UE with static, semi-static, semi-persistent, or periodic measurement resources (e.g., using radio resource control (RRC) messages), and the UE may report the interference measurements to the network node in a CLI report (e.g., via L3 signaling, an uplink medium access control (MAC) control element (MAC-CE), a physical uplink control channel (PUCCH), or a physical uplink shared channel (PUSCH), among other examples). In some aspects, the interference measurements, or CLI measurements, may include RSRP measurements and/or RSSI measurements using a sounding reference signal (SRS) resource configuration parameter (e.g., SRS-ResourceConfigCLI-r16) to measure an RSRP associated with periodic SRS resources, or an RSSI resource configuration parameter (e.g., RSSI-ResourceConfigCLI-r16) that configures a UE to measure an RSSI based on energy in a given bandwidth. Additionally, or alternatively, the UE may be configured to measure a demodulation reference signal (DMRS) or other signal(s) when making the CLI measurements.

CLI reporting may enable a network node to adjust communication parameters with a UE to address CLI (e.g., by selecting a downlink resource allocation and other communication parameters, including a downlink beam, to mitigate CLI). This may include, for example, adjusting communication parameters of a downlink UE experiencing CLI and/or adjusting communication parameters of other UEs that are causing intra-cell CLI. However, in a situation where a UE experiences inter-cell CLI, which may be caused by another network node and/or a UE in communication with another network node, the network node may be unable to adjust communication parameters of the devices causing inter-cell CLI. This limits a network node to communication parameter adjustments within its own cell and may limit the CLI mitigation that can be provided by the network node, as it limits the options for communication parameter adjustments to devices within the network node's cell. This may lead to more frequent CLI measurements, increased reporting overhead, and/or increased network and processing resource usage, as UEs and network nodes communicate with one another to adjust communication parameters in an effort to mitigate CLI.

Some techniques and apparatuses described herein enable CLI information exchange between network nodes, which may enable a network node to communicate CLI information to another network node. For example, a first network node may receive, from a first UE, a CLI report indicating CLI with a second UE that is in communication with a second network node. The first network node may transmit (e.g., via backhaul or an over-the-air (OTA) interface) CLI information indicating the CLI to the second network node, and the second network node may configure communications with the second UE based at least in part on the CLI information. As a result, the CLI information exchange between network nodes enables the network nodes to work together, providing additional options for adjusting communication parameters to mitigate inter-cell CLI. In this way, CLI information may be used by multiple network nodes to adjust communication parameters of UEs in different cells to mitigate CLI between UEs operating in difference cells. This may reduce the frequency of CLI measurement and reporting, which may reduce overhead caused by CLI reporting and conserve network and/or processing resources that might otherwise be consumed by more limited CLI communication adjustment capabilities.

Figure 6:
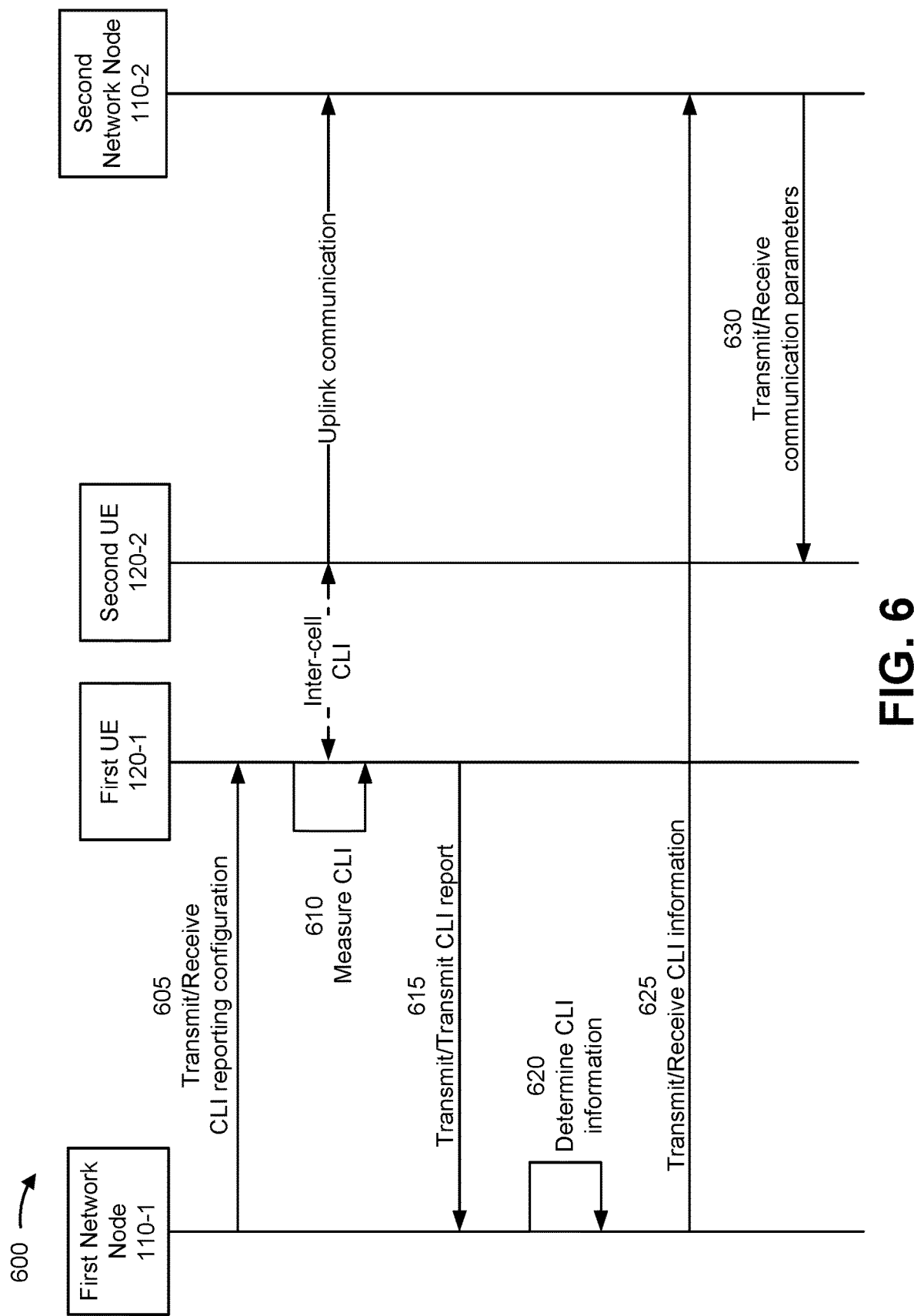
FIG. 6 is a diagram of an example associated with CLI information exchange, in accordance with the present disclosure.

FIG. 6 is a diagram of an example 600 associated with CLI information exchange, in accordance with the present disclosure. As shown in FIG. 6, multiple network nodes may communicate with multiple UEs. For example, a first network node (e.g., network node 110-1) associated with a first cell may be in communication with a first UE (e.g., UE 120-1), and a second network node (e.g., network node 110-2) associated with a second cell may be in communication with a second UE (e.g., UE 120-2). Each of the network nodes may include one or more network nodes 110, one or more CUs, one or more DUs, one or more RUs, one or more core network nodes, one or more network servers, one or more application servers, and/or one or more access and mobility management functions (AMFs), among other examples. In some aspects, the first UE and the first network node may be part of a wireless network (e.g., wireless network 100). The first UE and the first network node may have established a wireless connection prior to operations shown in FIG. 6. In some aspects, the first network node and the second network node may be associated with the same carrier or different carriers.

As shown by reference number 605, the first network node may transmit, and the first UE may receive, CLI reporting configuration information. In some aspects, the first UE may receive the configuration information via one or more of radio resource control (RRC) signaling, one or more medium access control (MAC) control elements (CEs), and/or downlink control information (DCI), among other examples. In some aspects, the configuration information may include an indication of one or more configuration parameters (e.g., already known to the UE and/or previously indicated by the first network node or other network device) for selection by the UE, and/or explicit configuration information for the UE to use to configure the UE, among other examples.

In some aspects, the configuration information may indicate that the UE is to measure CLI in association with a set of communication resources (e.g., using configured time, frequency, and/or spatial resources), in a manner described herein.

In some aspects, the first network node may transmit, and the UE may receive, separate from or included with the CLI reporting configuration information, information indicating a time window associated with measurement of at least one CLI reference signal. For example, the first network node may signal a specific time window in which a reference signal (e.g., an SRS) is expected to arrive at the first UE. In this situation, the UE may estimate an arrival of the reference signal and configure itself for monitoring within the time window.

The UE may configure itself based at least in part on the configuration information. In some aspects, the UE may be configured to perform one or more operations described herein based at least in part on the CLI reporting configuration information.

As shown by reference number 610, the first UE may measure CLI. For example, the first UE may measure CLI based at least in part on the CLI reporting configuration information, as described herein. As shown, the second UE may transmit an uplink communication to the second network node while the first UE is measuring CLI. In this situation, the first UE may determine a measure of CLI based at least in part on the uplink communication. For example, as described herein, the CLI may be based at least in part on an RSRP measurement and/or an RSSI measurement of a reference signal included in the uplink communication from the second UE, such as an SRS or DMRS, among other examples. In this example, the CLI measured may be inter-UE CLI.

In some aspects, based at least in part on the measurement of the reference signal by the first UE, the first UE may determine a time difference between a time window (e.g., provided by the first network node) and receipt of the reference signal. For example, the first network node may have identified a time window (e.g., in symbols), and the first UE may determine a timing difference between arrival of the reference signal and the time window, which may indicate a downlink signal arrival time. When provided to the first network node, as described herein, the difference between the timing window and the arrival of the reference signal may facilitate the alignment of communications timing between the first network node and the first UE (e.g., to reduce CLI).

In some aspects, the first UE may determine a power backoff recommendation based at least in part on the reference signal. For example, in a situation where the second UE communicates using a particular CLI resource, the first UE may determine that power backoff, by the second UE, would reduce CLI below a CLI threshold, such that the first UE could then receive a downlink communication from the first network node while the second UE transmitted after the power backoff. In some aspects, the power backoff recommendation may be based at least in part on an MCS or a transport block (TB) size associated with downlink communications from the first network node to the first UE. For example, higher MCS and/or higher TB size may indicate a higher quality link between the first UE and the first network node, which may indicate that a lower power backoff would be sufficient to reduce CLI below a CLI threshold; conversely, lower MCS and/or lower TB size may indicate a lower quality link between the first UE and the first network node, which may indicate that a higher power backoff would be preferred to reduce CLI below the CLI threshold.

As shown by reference number 615, the first UE may transmit, and the first network node may receive, a CLI report. For example, the CLI report may be transmitted as described herein, and may include CLI information that indicates the CLI experienced by the first UE. In some aspects, the first UE may provide, included in the CLI report or separate from the CLI report, information regarding a power backoff recommendation or a timing difference, as described herein.

For example, the first UE may provide information indicating the time difference between arrival of a downlink communication from the first network node and arrival of the reference signal from the second UE. As another example, the first UE may provide information indicating the power backoff recommendation for the second UE.

In some aspects, the time difference, power backoff recommendation, and/or other information associated with the CLI report may be used by the first network node to schedule communications with the first UE. For example, in a situation where the first network node determines, based at least in part on the CLI report and/or other information described herein, that the channel conditions measured by the first UE are not likely to be addressed by reconfiguring and/or rescheduling communications with other UEs, the first network node may reconfigure and/or reschedule communications with the first UE. In some aspects, the reconfiguration and/or rescheduling of communications with the first UE may be performed in addition to, or alternatively to, the exchange of CLI information to reconfigure/reschedule communications with one or more other UEs.

As shown by reference number 620, the first network node may determine CLI information. For example, based at least in part on the CLI report received from the first UE (e.g., including information related to the CLI, such as the power backoff recommendation and/or the time difference), the first network node may determine the CLI information to be transmitted to the second network node.

In some aspects, the first network node may determine, based at least in part on the CLI report, a CLI resource identifier associated with a least CLI value. For example, the CLI report may indicate the CLI resource identifier (e.g., CLI resource identifier, reference signal identifier, beam identifier, and/or time and frequency resources) for which the first UE experienced the least CLI. The CLI resource identifier associated with the least CLI may be included in the CLI information to enable the second network node to avoid using the CLI resource identifier for communications with other UEs, which may mitigate CLI for communications between the first network node and the first UE using the CLI resource identifier. In some aspects, the CLI information may indicate a number of CLI resources (e.g., beams, reference signal identifiers) associated with CLI measurements of the first UE. For example, the number of CLI resources may be based at least in part on a first number of transmit beams associated with the first UE and a second number of receive beams associated with a second UE associated with the CLI. Additionally, or alternatively, the CLI information may include multiple reference signal identifiers. Providing CLI information that includes the number of CLI resources, beams, and/or reference signal identifiers may enable the second network node to cause one or more UEs associated with the beams and/or reference signals (e.g., which may include the second UE) to perform CLI reporting, in an effort to avoid CLI for the one or more other UEs as well as the first UE. For example, the CLI information may indicate 5 CLI resources that were measured by the first UE, and the second network node may configure the second UE to measure 4 CLI resources for each of the 5 CLI resources of the first UE, leading to measurement of 20 (e.g., 5×4=20) CLI resources by the second UE (e.g., beam sweeping the CLI resources by the second UE).

As shown by reference number 625, the first network node may transmit, and the second network node may receive, the CLI information. For example, the CLI information may be transmitted via a backhaul interface or an OTA interface between the network nodes. In some aspects, a separate OTA or backhaul interface (e.g., an inter-network node interface, such as an inter-DU interface or inter-CU interface, among other examples) may be used for the exchange of CLI information, which may include a Layer 1 or Layer 2 inter-UE CLI configured report, as described herein.

In some aspects, the first network node may transmit information identifying a CLI resource identifier. For example, the CLI resource identifier may identify at least one reference signal identifier and/or beam identifier, as described herein.

In some aspects, the first network node may transmit information indicating a time difference between a scheduled downlink communication arriving at the first UE and the CLI reference signal arrival time. In some aspects, the first network node may transmit information indicating a power backoff recommendation. For example, the first UE may have provided the power backoff recommendation to the first network node, as described herein. In some aspects, the first network node may determine the power backoff recommendation (e.g., based on the CLI report), in a manner similar to that of the first UE, as described herein.

As shown by reference number 630, the second network node configures communications with the second UE based at least in part on the CLI information. For example, the second network node may transmit, and the second UE may receive, communication parameters that cause the second UE to use different parameters for communicating with the second network node, in an effort to avoid causing CLI for the downlink communications to the first UE. Changes to communication parameters may include, for example, changing transmit power, time, frequency, and/or spatial resources for the communications between the second network node and the second UE.

In some aspects, the second network node may configure communications with the second UE based at least in part on a CLI resource identifier associated with (e.g., included in or transmitted separately from) the CLI information. For example, the CLI resource identifier may indicate one or more reference signal identifiers and/or beam identifiers associated with CLI experienced by the first UE. In some aspects, the CLI information may indicate a number of beams associated with CLI measurements of the UE. In some aspects, the second network node may transmit CLI configuration information to the second UE, to cause the UE to perform CLI measurements associated with the number of beams indicated in the CLI information received from the first network node. In this way, the second network node may trigger CLI reporting for one or more UEs, which may further facilitate selection of communications resources that mitigates CLI.

In some aspects, the second network node may configure the communications with the second UE based at least in part on downlink parameters. For example, the downlink parameters may be based at least in part on an MCS or TB size associated with communications between the first UE and the first network node. As described herein, the MCS and TB size may be indicative of the quality of the link between the first network node and the first UE, which may enable the second network node to configure communication parameters with the second UE differently. For example, if the link quality between the first network node and first UE is relatively high, the second network node may make relatively minor changes to communication parameters for the second UE. If the link quality between the first network node and first UE is relatively low, the second network node may make relatively major changes to communication parameters for the second UE.

In some aspects, the second network node may receive, from the first network node, information indicating, for the first UE, the time difference between receipt of downlink communications transmitted to the UE and receipt of a CLI reference signal by the UE. As described herein, the second network node may use the time difference to schedule communications with the second UE to mitigate CLI experienced by the first UE. In some aspects, the second network node may receive a power backoff recommendation for the second UE. As described herein, the second network node may use the power backoff recommendation to configure the second UE to use less power for transmissions on resources indicated by the power backoff recommendation.

In some aspects, the first UE, first network node, second network node, and second UE may continue exchanging CLI information in order to determine communications parameters that mitigate CLI experienced by the UEs. For example, the second network node and second UE may perform operations similar to those described as being performed by the first UE and the first network node, resulting in a two-way CLI information exchange that enables the network nodes to determine resource configurations that mitigate CLI for the respective UEs. In addition, the network nodes may perform similar operations with other UEs in communication with the network nodes and may exchange information with other network nodes associated with UEs that contribute to CLI for the UEs of the respective network nodes.

As shown in example 600, the exchange of CLI information between network nodes enables the network nodes to work together and provide options for adjusting communication parameters to mitigate inter-cell CLI. In this way, CLI information may be used by multiple network nodes to adjust communication parameters of UEs in different cells to mitigate CLI between UEs operating in difference cells. This may reduce the frequency of CLI measurement and reporting, which may reduce overhead caused by CLI reporting and conserve network and/or processing resources that might otherwise be consumed by more limited CLI communication adjustment capabilities.

As indicated above, FIG. 6 is provided as an example. Other examples may differ from what is described with respect to FIG. 6. For example, while only two UEs are depicted in FIG. 6, any number of other UEs could be in communication with the first network node and/or the second network node, and may cause additional CLI (intra-cell and intercell) for the first UE. In some aspects, other communications, such as sidelink communications, may also cause CLI for the first UE, which may be indicated in the CLI report. In a situation where sidelink communications are configured by the network nodes, the network nodes may reconfigure sidelink communication parameters in a manner similar to reconfiguration of the uplink communications described herein.

While various transmissions of different types of information related to CLI are described herein (e.g., CLI reports, power backoff recommendations, and/or a time difference, among other examples), CLI-related information may be exchanged between network nodes and UEs in one or multiple communications. For example, the first UE may communicate all CLI-related information to the first network node via the CLI report. As another example, the first UE may communicate different CLI-related information to the first network node separately (e.g., in separate communications for a CLI report, a power backoff recommendation, and/or a time difference, among other examples). Similarly, the CLI information communicated between network nodes may be included in one communication or multiple separate communications.

Figure 7:
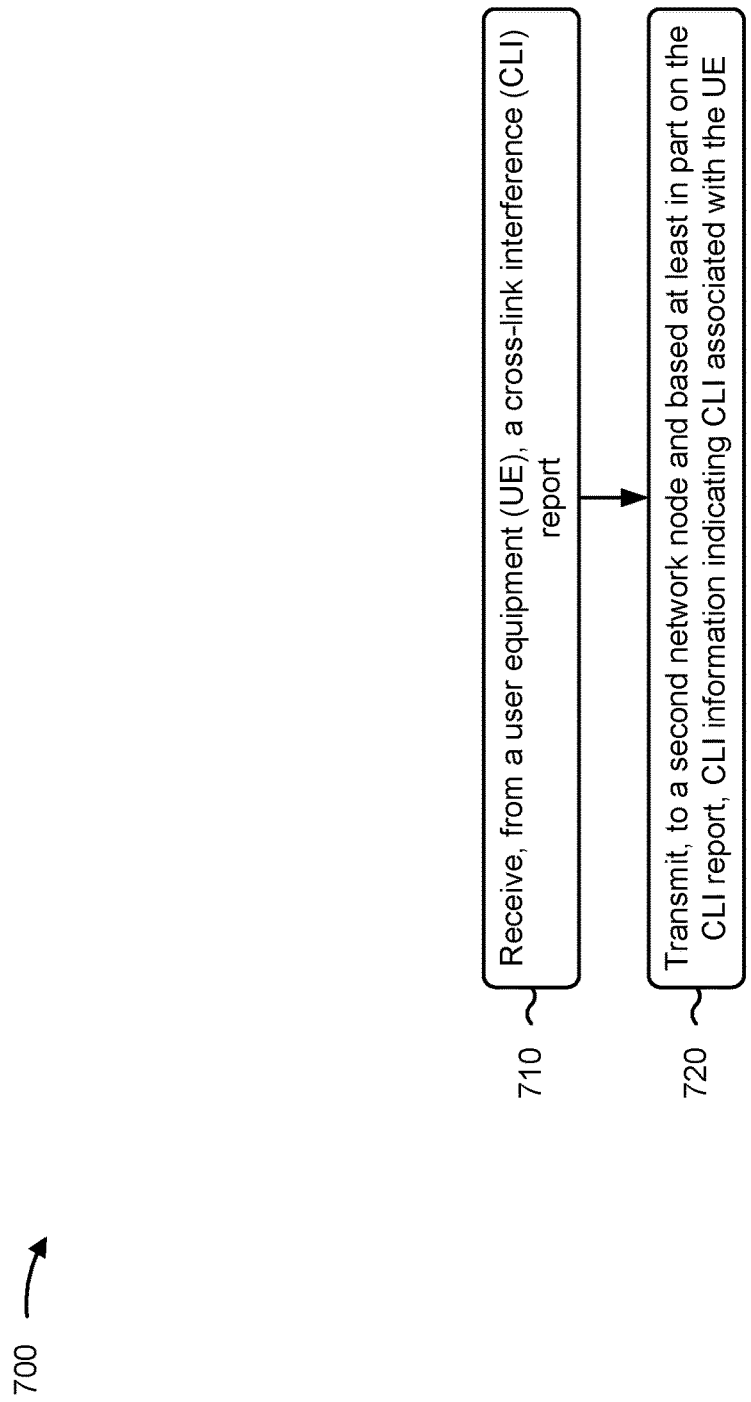
FIGS. 7 and 8 are diagrams illustrating example processes performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with CLI information exchange.

As shown in FIG. 7, in some aspects, process 700 may include receiving, from a UE, a CLI report (block 710). For example, the network node (e.g., using communication manager 150 and/or reception component 1002, depicted in FIG. 10) may receive, from a UE, a CLI report, as described above.

As further shown in FIG. 7, in some aspects, process 700 may include transmitting, to a second network node and based at least in part on the CLI report, CLI information indicating CLI associated with the UE (block 720). For example, the network node (e.g., using communication manager 150 and/or transmission component 1004, depicted in FIG. 10) may transmit, to a second network node and based at least in part on the CLI report, CLI information indicating CLI associated with the UE, as described above.

Process 700 may include additional aspects, such as any single aspect or any combination of aspects described below and/or in connection with one or more other processes described elsewhere herein.

In a first aspect, transmitting the CLI information comprises transmitting the CLI information via a backhaul interface with the second network node.

In a second aspect, alone or in combination with the first aspect, transmitting the CLI information comprises transmitting the CLI information via an over-the-air interface with the second network node.

In a third aspect, alone or in combination with one or more of the first and second aspects, the first network node is associated with a first CU and the second network node is associated with a second CU.

In a fourth aspect, alone or in combination with one or more of the first through third aspects, the first network node is a first DU and the second network node is a second DU.

In a fifth aspect, alone or in combination with one or more of the first through fourth aspects, process 700 includes determining, based at least in part on the CLI report, a CLI resource identifier associated with a least CLI value, and transmitting, to the second network node, information identifying the CLI resource identifier.

In a sixth aspect, alone or in combination with one or more of the first through fifth aspects, the CLI resource identifier is associated with at least one of a reference signal identifier or a beam identifier.

In a seventh aspect, alone or in combination with one or more of the first through sixth aspects, the CLI information indicates a number of beams associated with CLI measurements of the UE.

In an eighth aspect, alone or in combination with one or more of the first through seventh aspects, process 700 includes transmitting, to the UE, information indicating a time window associated with measurement of at least one CLI reference signal, and receiving, from the UE, information indicating a time difference between arrival of a downlink communication from the first network node and arrival of the at least one CLI reference signal.

In a ninth aspect, alone or in combination with one or more of the first through eighth aspects, process 700 includes scheduling communications with the UE based at least in part on the information indicating the time difference.

In a tenth aspect, alone or in combination with one or more of the first through ninth aspects, process 700 includes transmitting, to the second network node, the information indicating the time difference.

In an eleventh aspect, alone or in combination with one or more of the first through tenth aspects, process 700 includes receiving, from the UE, a power backoff recommendation for another UE associated with the second network node, and transmitting, to the second network node, information indicating the power backoff recommendation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
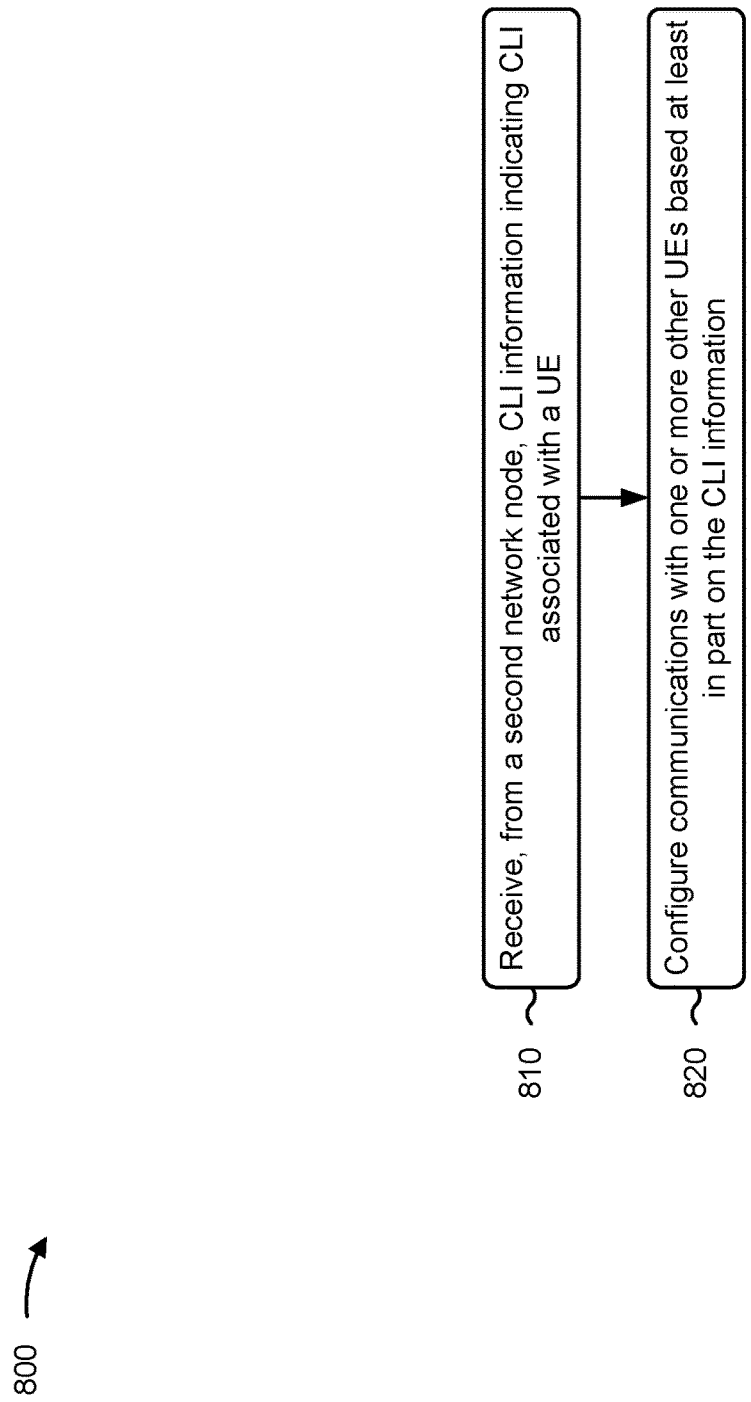

FIG. 8 is a diagram illustrating an example process 800 performed, for example, by a network node, in accordance with the present disclosure. Example process 800 is an example where the network node (e.g., network node 110) performs operations associated with CLI information exchange.

As shown in FIG. 8, in some aspects, process 800 may include receiving, from a second network node, CLI information indicating CLI associated with a UE (block 810). For example, the network node (e.g., using communication manager 150 and/or reception component 1002, depicted in FIG. 10) may receive, from a second network node, CLI information indicating CLI associated with a UE, as described above.

As further shown in FIG. 8, in some aspects, process 800 may include configuring communications with one or more other UEs based at least in part on the CLI information (block 820). For example, the network node (e.g., using communication manager 150 and/or configuration component 1010, depicted in FIG. 10) may configure communications with one or more other UEs based at least in part on the CLI information, as described above.

Process 800 may include additional aspects, such as any single aspect or any combination of aspects described below and/or in connection with one or more other processes described elsewhere herein.

In a first aspect, receiving the CLI information comprises receiving the CLI information via a backhaul interface with the second network node.

In a second aspect, alone or in combination with the first aspect, receiving the CLI information comprises receiving the CLI information via an over-the-air interface with the second network node.

In a third aspect, alone or in combination with one or more of the first and second aspects, the first network node is associated with a first CU and the second network node is associated with a second CU.

In a fourth aspect, alone or in combination with one or more of the first through third aspects, the first network node is a first DU and the second network node is a second DU.

In a fifth aspect, alone or in combination with one or more of the first through fourth aspects, process 800 includes receiving, from the second network node, information identifying a CLI resource identifier, and configuring the communications comprises configuring the communications based at least in part on the CLI resource identifier.

In a sixth aspect, alone or in combination with one or more of the first through fifth aspects, the CLI resource identifier is associated with at least one of a reference signal identifier or a beam identifier.

In a seventh aspect, alone or in combination with one or more of the first through sixth aspects, the CLI information indicates a number of beams associated with CLI measurements of the UE, and process 800 includes transmitting, to another UE of the one or more other UEs, CLI configuration information indicating that the other UE is to perform CLI measurements associated with the number of beams associated with the UE.

In an eighth aspect, alone or in combination with one or more of the first through seventh aspects, process 800 includes receiving, from the second network node, information indicating, for the UE, a time difference between receipt of downlink communications transmitted to the UE and receipt of a CLI reference signal by the UE.

In a ninth aspect, alone or in combination with one or more of the first through eighth aspects, process 800 includes scheduling communications with another UE, of the one or more other UEs, based at least in part on the information indicating the time difference.

In a tenth aspect, alone or in combination with one or more of the first through ninth aspects, process 800 includes receiving, from the second network node, a power backoff recommendation for another UE, of the one or more other UEs, and configuring communications with the other UE based at least in part on the power backoff recommendation.

In an eleventh aspect, alone or in combination with one or more of the first through tenth aspects, configuring the communications comprises configuring the communications based at least in part on one or more downlink parameters, the one or more downlink parameters including at least one of a modulation and coding scheme, or a transport block size.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
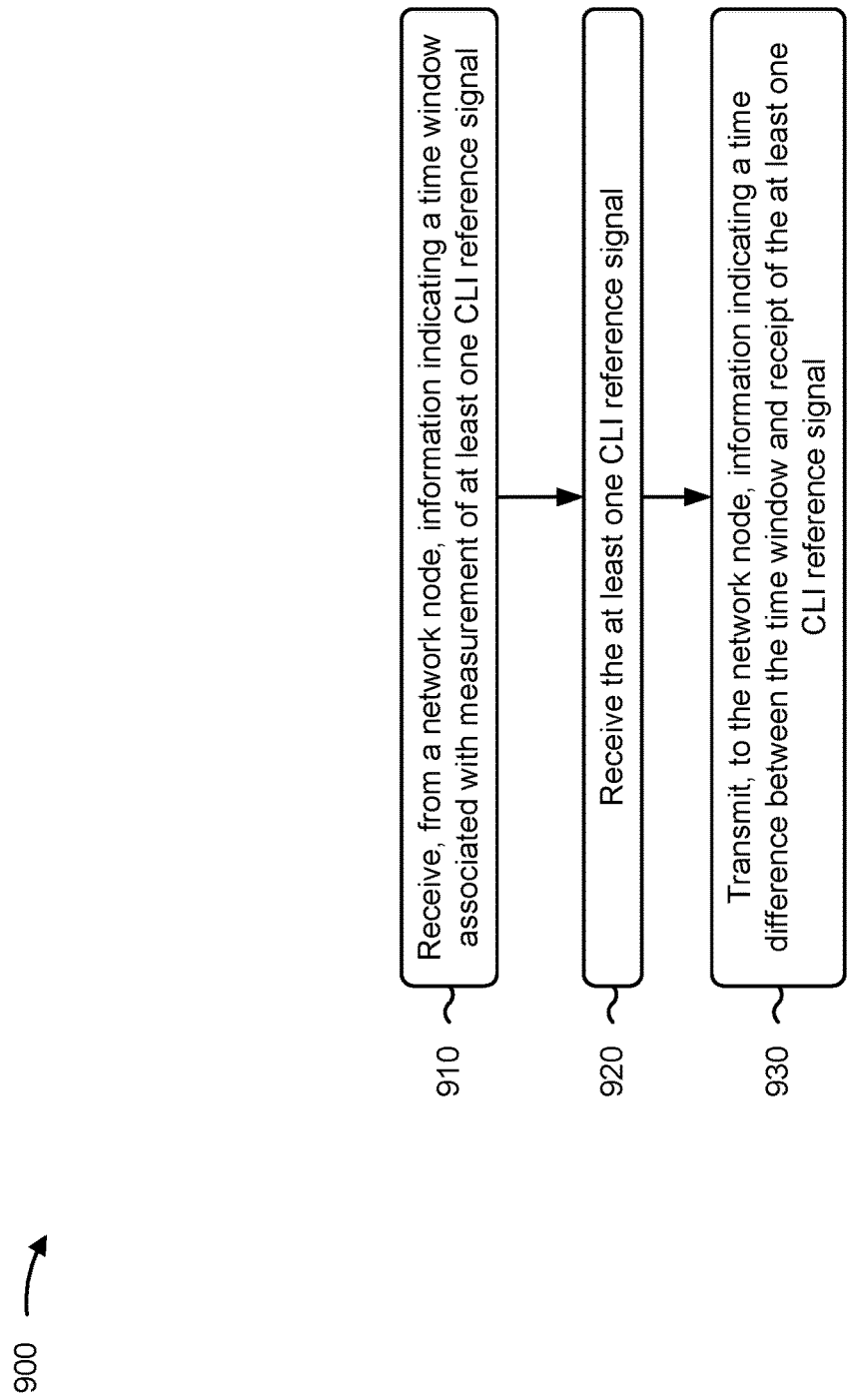
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with CLI information exchange.

As shown in FIG. 9, in some aspects, process 900 may include receiving, from a network node, information indicating a time window associated with measurement of at least one CLI reference signal (block 910). For example, the UE (e.g., using communication manager 140 and/or reception component 1102, depicted in FIG. 11) may receive, from a network node, information indicating a time window associated with measurement of at least one CLI reference signal, as described above.

As further shown in FIG. 9, in some aspects, process 900 may include receiving the at least one CLI reference signal (block 920). For example, the UE (e.g., using communication manager 140 and/or reception component 1102, depicted in FIG. 11) may receive the at least one CLI reference signal, as described above.

As further shown in FIG. 9, in some aspects, process 900 may include transmitting, to the network node, information indicating a time difference between the time window and receipt of the at least one CLI reference signal (block 930). For example, the UE (e.g., using communication manager 140 and/or transmission component 1104, depicted in FIG. 11) may transmit, to the network node, information indicating a time difference between the time window and receipt of the at least one CLI reference signal, as described above.

Process 900 may include additional aspects, such as any single aspect or any combination of aspects described below and/or in connection with one or more other processes described elsewhere herein.

In a first aspect, process 900 includes transmitting, to the network node, a power backoff recommendation for another UE associated with another network node.

In a second aspect, alone or in combination with the first aspect, process 900 includes determining the power backoff recommendation based at least in part on the at least one CLI reference signal.

In a third aspect, alone or in combination with one or more of the first and second aspects, the power backoff recommendation is based at least in part on a modulation and coding scheme, or a transport block size.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
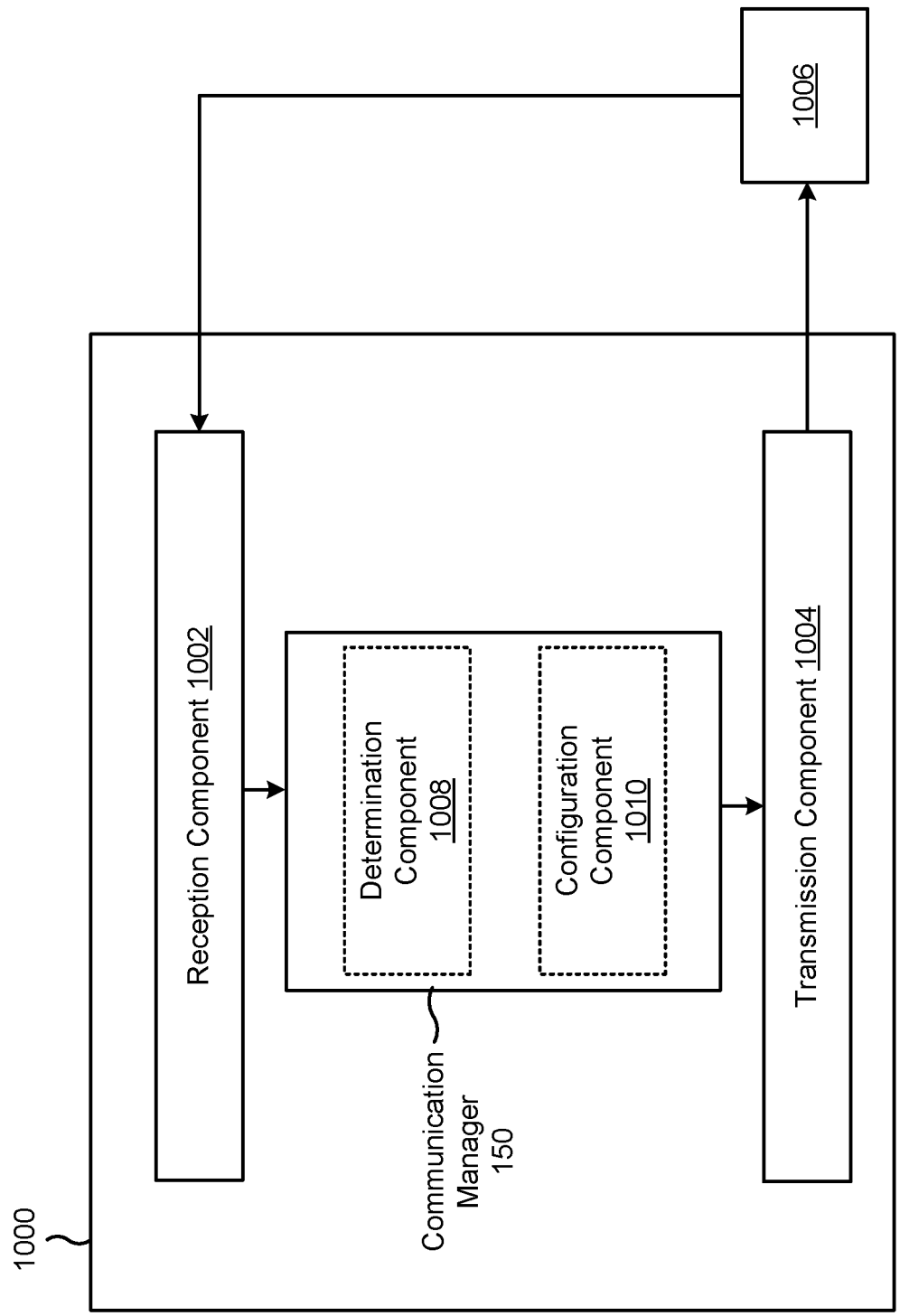
FIGS. 10 and 11 are diagrams of example apparatuses for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150) may include one or more of a determination component 1008 or a configuration component 1010, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive, from a UE, a CLI report. The transmission component 1004 may transmit, to a second network node and based at least in part on the CLI report, CLI information indicating CLI associated with the UE.

The determination component 1008 may determine, based at least in part on the CLI report, a CLI resource identifier associated with a least CLI value.

The transmission component 1004 may transmit, to the second network node, information identifying the CLI resource identifier.

The transmission component 1004 may transmit, to the UE, information indicating a time window associated with measurement of at least one CLI reference signal.

The reception component 1002 may receive, from the UE, information indicating a time difference between arrival of a downlink communication from the first network node and arrival of the at least one CLI reference signal.

The transmission component 1004 may transmit, to the second network node, the information indicating the time difference.

The reception component 1002 may receive, from the UE, a power backoff recommendation for another UE associated with the second network node.

The transmission component 1004 may transmit, to the second network node, information indicating the power backoff recommendation.

The reception component 1002 may receive, from a second network node, CLI information indicating CLI associated with a UE. The configuration component 1010 may configure communications with one or more other UEs based at least in part on the CLI information.

The reception component 1002 may receive, from the second network node, information identifying a CLI resource identifier.

The reception component 1002 may receive, from the second network node, information indicating, for the UE, a time difference between receipt of downlink communications transmitted to the UE and receipt of a CLI reference signal by the UE.

The reception component 1002 may receive, from the second network node, a power backoff recommendation for another UE, of the one or more other UEs.

The configuration component 1010 may configure communications with the other UE based at least in part on the power backoff recommendation.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
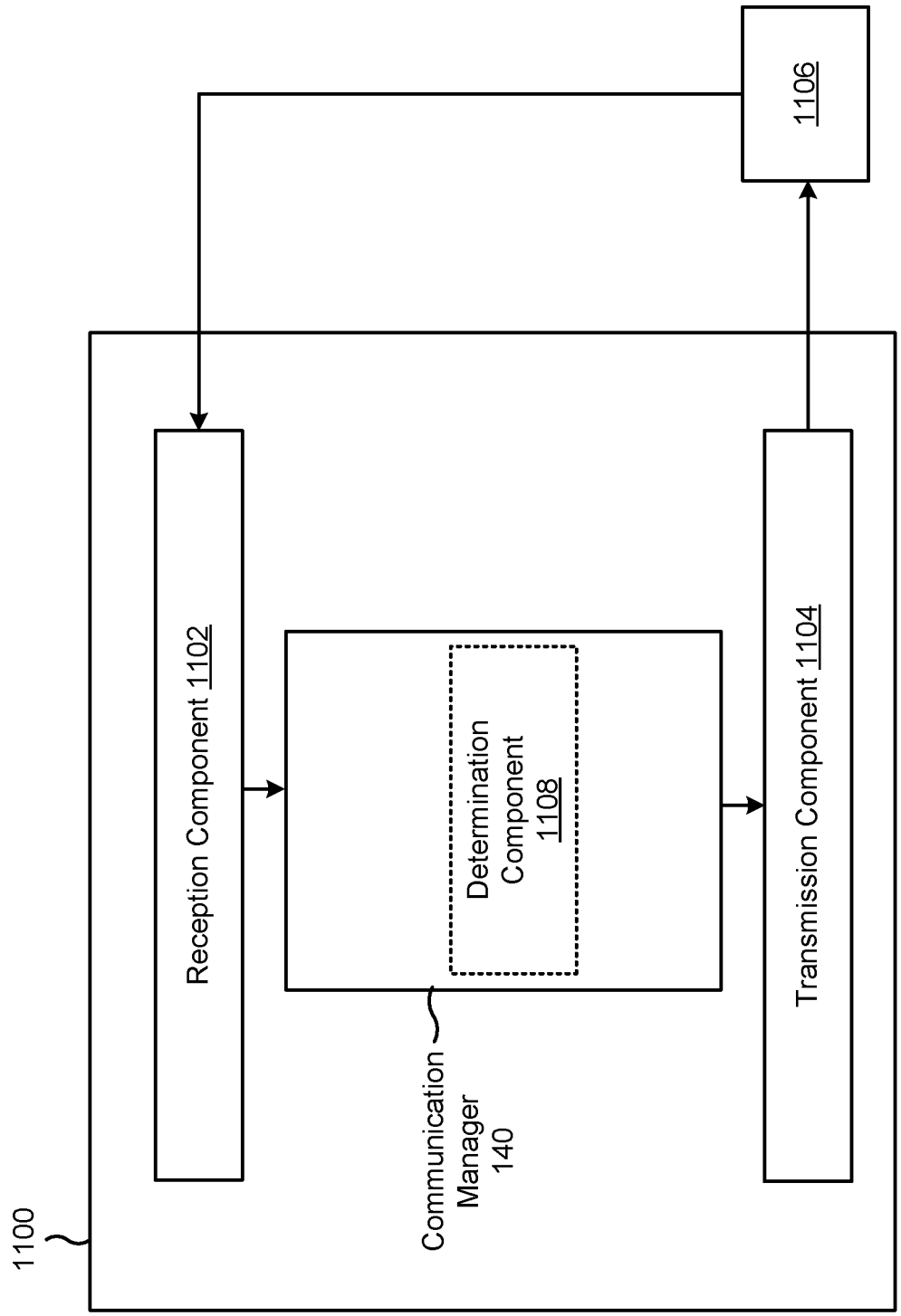

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIGS. 4-6. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a network node, information indicating a time window associated with measurement of at least one CLI reference signal. The reception component 1102 may receive the at least one CLI reference signal. The transmission component 1104 may transmit, to the network node, information indicating a time difference between the time window and receipt of the at least one CLI reference signal.

The transmission component 1104 may transmit, to the network node, a power backoff recommendation for another UE associated with another network node.

The determination component 1108 may determine the power backoff recommendation based at least in part on the at least one CLI reference signal.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an apparatus of a first network node, comprising: receiving, from a UE, a CLI report; and transmitting, to a second network node and based at least in part on the CLI report, CLI information indicating CLI associated with the UE.

Aspect 2: The method of Aspect 1, wherein transmitting the CLI information comprises: transmitting the CLI information via a backhaul interface with the second network node.

Aspect 3: The method of any of Aspects 1-2, wherein transmitting the CLI information comprises: transmitting the CLI information via an over-the-air interface with the second network node.

Aspect 4: The method of any of Aspects 1-3, wherein the first network node is associated with a first CU and the second network node is associated with a second CU.

Aspect 5: The method of any of Aspects 1-4, wherein the first network node is a first DU and the second network node is a second DU.

Aspect 6: The method of any of Aspects 1-5, further comprising: determining, based at least in part on the CLI report, a CLI resource identifier associated with a CLI value; and transmitting, to the second network node, information identifying the CLI resource identifier.

Aspect 7: The method of Aspect 6, wherein determining the CLI resource identifier comprises: determining the CLI resource identifier based at least in part on the CLI value being a least CLI value among CLI values indicated in the CLI report.

Aspect 8: The method of Aspect 6, wherein the CLI resource identifier is associated with at least one of a reference signal identifier or a beam identifier.

Aspect 9: The method of any of Aspects 1-8, wherein the CLI information indicates a number of CLI resources associated with CLI measurements of the UE, and wherein the number of CLI resources is based at least in part on a first number of transmit beams associated with the UE and a second number of receive beams associated with a second UE associated with the CLI.

Aspect 10: The method of any of Aspects 1-9, further comprising: transmitting, to the UE, information indicating a time window associated with measurement of at least one CLI reference signal; and receiving, from the UE, information indicating a time difference between arrival of a downlink communication from the first network node and arrival of the at least one CLI reference signal.

Aspect 11: The method of Aspect 10, further comprising: scheduling communications with the UE based at least in part on the information indicating the time difference.

Aspect 12: The method of Aspect 10, further comprising: transmitting, to the second network node, the information indicating the time difference.

Aspect 13: The method of any of Aspects 1-12, further comprising: receiving, from the UE, a power backoff recommendation for another UE associated with the second network node; and transmitting, to the second network node, information indicating the power backoff recommendation.

Aspect 14: The method of any of Aspects 1-13, wherein the CLI information includes at least one CLI reference signal measurement resource configuration for at least one UE that includes the UE.

Aspect 15: A method of wireless communication performed by an apparatus of a first network node, comprising: receiving, from a second network node, CLI information indicating CLI associated with a UE; and configuring communications with one or more other UEs based at least in part on the CLI information.

Aspect 16: The method of Aspect 15, wherein the CLI information includes at least one CLI reference signal measurement resource configuration for at least one UE that includes the UE.

Aspect 17: The method of Aspect 15, wherein receiving the CLI information comprises: receiving the CLI information via a backhaul interface with the second network node.

Aspect 18: The method of any of Aspects 15-17, wherein receiving the CLI information comprises: receiving the CLI information via an over-the-air interface with the second network node.

Aspect 19: The method of any of Aspects 15-18, wherein the first network node is associated with a first CU and the second network node is associated with a second CU.

Aspect 20: The method of any of Aspects 15-19, wherein the first network node is a first DU and the second network node is a second DU.

Aspect 21: The method of any of Aspects 15-20, further comprising: receiving, from the second network node, information identifying a CLI resource identifier; and wherein configuring the communications comprises: configuring the communications based at least in part on the CLI resource identifier.

Aspect 22: The method of Aspect 21, wherein the CLI resource identifier is associated with at least one of a reference signal identifier or a beam identifier.

Aspect 23: The method of any of Aspects 15-22, wherein the CLI information indicates a number of CLI resources associated with CLI measurements of the UE, and wherein the number of CLI resources is based at least in part on a first number of transmit beams associated with the UE and a second number of receive beams associated with another UE, of the one or more other UEs, associated with the CLI.

Aspect 24: The method of Aspect 23, wherein the method further comprises: transmitting, to the other UE, CLI configuration information indicating that the other UE is to perform CLI measurements associated with the number of CLI resources.

Aspect 25: The method of any of Aspects 15-24, further comprising: receiving, from the second network node, information indicating, for the UE, a time difference between receipt of downlink communications transmitted to the UE and receipt of a CLI reference signal by the UE.

Aspect 26: The method of Aspect 25, further comprising: scheduling communications with another UE, of the one or more other UEs, based at least in part on the information indicating the time difference.

Aspect 27: The method of any of Aspects 15-26, further comprising: receiving, from the second network node, a power backoff recommendation for another UE, of the one or more other UEs; and configuring communications with the other UE based at least in part on the power backoff recommendation.

Aspect 28: The method of Aspect 27, wherein configuring the communications comprises: configuring the communications based at least in part on one or more downlink parameters, the one or more downlink parameters including at least one of: a modulation and coding scheme, or a transport block size.

Aspect 29: A method of wireless communication performed by an apparatus of a UE, comprising: receiving, from a network node, information indicating a time window associated with measurement of at least one CLI reference signal; receiving the at least one CLI reference signal; and transmitting, to the network node, information indicating a time difference between the time window and receipt of the at least one CLI reference signal.

Aspect 30: The method of Aspect 29, further comprising: transmitting, to the network node, a power backoff recommendation for another UE associated with another network node.

Aspect 31: The method of Aspect 30, further comprising: determining the power backoff recommendation based at least in part on the at least one CLI reference signal.

Aspect 32: The method of Aspect 31, wherein the power backoff recommendation is based at least in part on: a modulation and coding scheme, or a transport block size.

Aspect 33: An apparatus for wireless communication at a device, comprising a processor; memory coupled with the processor; and instructions stored in the memory and executable by the processor to cause the apparatus to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: An apparatus for wireless communication at a device, comprising a processor; memory coupled with the processor; and instructions stored in the memory and executable by the processor to cause the apparatus to perform the method of one or more of Aspects 29-32.

Aspect 36: A device for wireless communication, comprising a memory and one or more processors coupled to the memory, the one or more processors configured to perform the method of one or more of Aspects 1-14.

Aspect 37: A device for wireless communication, comprising a memory and one or more processors coupled to the memory, the one or more processors configured to perform the method of one or more of Aspects 15-28.

Aspect 38: A device for wireless communication, comprising a memory and one or more processors coupled to the memory, the one or more processors configured to perform the method of one or more of Aspects 29-32.

Aspect 39: An apparatus for wireless communication, comprising at least one means for performing the method of one or more of Aspects 1-14.

Aspect 40: An apparatus for wireless communication, comprising at least one means for performing the method of one or more of Aspects 15-28.

Aspect 41: An apparatus for wireless communication, comprising at least one means for performing the method of one or more of Aspects 29-32.

Aspect 42: A non-transitory computer-readable medium storing code for wireless communication, the code comprising instructions executable by a processor to perform the method of one or more of Aspects 1-14.

Aspect 43: A non-transitory computer-readable medium storing code for wireless communication, the code comprising instructions executable by a processor to perform the method of one or more of Aspects 15-28.

Aspect 44: A non-transitory computer-readable medium storing code for wireless communication, the code comprising instructions executable by a processor to perform the method of one or more of Aspects 29-32.

Aspect 45: A non-transitory computer-readable medium storing a set of instructions for wireless communication, the set of instructions comprising one or more instructions that, when executed by one or more processors of a device, cause the device to perform the method of one or more of Aspects 1-14.

Aspect 46: A non-transitory computer-readable medium storing a set of instructions for wireless communication, the set of instructions comprising one or more instructions that, when executed by one or more processors of a device, cause the device to perform the method of one or more of Aspects 15-28.

Aspect 47: A non-transitory computer-readable medium storing a set of instructions for wireless communication, the set of instructions comprising one or more instructions that, when executed by one or more processors of a device, cause the device to perform the method of one or more of Aspects 29-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node for wireless communication, comprising:
   a memory; and
   one or more processors, coupled to the memory, configured to:
   receive, from a user equipment (UE), a cross-link interference (CLI) report;
   determine, based at least in part on the CLI report and on a CLI value being a least CLI value among CLI values indicated in the CLI report, a CLI resource identifier associated with the CLI value; and
   transmit, to a second network node and based at least in part on the CLI report, CLI information which indicates CLI associated with the UE and which identifies the CLI resource identifier.

2. The first network node of claim 1, wherein the CLI information includes at least one CLI reference signal measurement resource configuration for at least one UE that includes the UE.

3. The first network node of claim 1, wherein the one or more processors, to transmit the CLI information, are configured to:
   transmit the CLI information via a backhaul interface with the second network node.

4. The first network node of claim 1, wherein the one or more processors, to transmit the CLI information, are configured to:
   transmit the CLI information via an over-the-air interface with the second network node.

5. The first network node of claim 1, wherein the first network node is associated with a first central unit (CU) and the second network node is associated with a second CU.

6. The first network node of claim 1, wherein the first network node is a first distributed unit (DU) and the second network node is a second DU.

7. The first network node of claim 1, wherein the CLI resource identifier is associated with at least one of a reference signal identifier or a beam identifier.

8. The first network node of claim 1, wherein the CLI information further indicates a number of CLI resources associated with CLI measurements of the UE, and
wherein the number of CLI resources is based at least in part on a first number of transmit beams associated with the UE and a second number of receive beams associated with a second UE associated with the CLI.

9. The first network node of claim 1, wherein the one or more processors are further configured to:
transmit, to the UE, information indicating a time window associated with measurement of at least one CLI reference signal; and
receive, from the UE, information indicating a time difference between arrival of a downlink communication from the first network node and arrival of the at least one CLI reference signal.

10. The first network node of claim 9, wherein the one or more processors are further configured to:
schedule communications with the UE based at least in part on the information indicating the time difference.

11. The first network node of claim 9, wherein the one or more processors are further configured to:
transmit, to the second network node, the information indicating the time difference.

12. The first network node of claim 1, wherein the one or more processors are further configured to:
receive, from the UE, a power backoff recommendation for another UE associated with the second network node; and
transmit, to the second network node, information indicating the power backoff recommendation.

13. A first network node for wireless communication, comprising:
a memory; and
one or more processors, coupled to the memory, configured to:
receive, from a second network node, cross-link interference (CLI) information that indicates CLI associated with a user equipment (UE) and that indicates a number of CLI resources associated with CLI measurements of the UE, wherein the number of CLI resources is based at least in part on a first number of transmit beams associated with the UE and a second number of receive beams associated with another UE, of one or more other UEs, associated with the CLI; and
configure communications with the one or more other UEs based at least in part on the CLI information.

14. The first network node of claim 11, wherein the CLI information includes at least one CLI reference signal measurement resource configuration for at least one UE that includes the UE.

15. The first network node of claim 11, wherein the one or more processors, to receive the CLI information, are configured to:
receive the CLI information via a backhaul interface with the second network node.

16. The first network node of claim 11, wherein the one or more processors, to receive the CLI information, are configured to:
receive the CLI information via an over-the-air interface with the second network node.

17. The first network node of claim 11, wherein the first network node is associated with a first central unit (CU) and the second network node is associated with a second CU.

18. The first network node of claim 11, wherein the first network node is a first distributed unit (DU) and the second network node is a second DU.

19. The first network node of claim 11, wherein the one or more processors are further configured to:
receive, from the second network node, information identifying a CLI resource identifier; and
wherein the one or more processors, to configure the communications, are configured to:
configure the communications based at least in part on the CLI resource identifier.

20. The first network node of claim 19, wherein the CLI resource identifier is associated with at least one of a reference signal identifier or a beam identifier.

21. The first network node of claim 13,
wherein the one or more processors are further configured to:
transmit, to the other UE, CLI configuration information indicating that the other UE is to perform CLI measurements associated with the number of CLI resources.

22. The first network node of claim 13, wherein the one or more processors are further configured to:
receive, from the second network node, information indicating, for the UE, a time difference between receipt of downlink communications transmitted to the UE and receipt of a CLI reference signal by the UE.

23. The first network node of claim 22, wherein the one or more processors are further configured to:
schedule communications with another UE, of the one or more other UEs, based at least in part on the information indicating the time difference.

24. The first network node of claim 13, wherein the one or more processors are further configured to:
receive, from the second network node, a power backoff recommendation for another UE, of the one or more other UEs; and
configure communications with the other UE based at least in part on the power backoff recommendation.

25. The first network node of claim 24, wherein the one or more processors, to configure the communications, are configured to:
configure the communications based at least in part on one or more downlink parameters, the one or more downlink parameters including at least one of:
a modulation and coding scheme, or
a transport block size.

26. A user equipment (UE) for wireless communication, comprising:
a memory; and
one or more processors, coupled to the memory, configured to:
receive, from a network node, information indicating a time window associated with measurement of at least one cross-link interference (CLI) reference signal;
receive the at least one CLI reference signal; and
transmit, to the network node, information indicating a time difference between the time window and receipt of the at least one CLI reference signal.

27. The UE of claim 26, wherein the information includes at least one CLI reference signal measurement resource configuration for at least one UE that includes the UE.

28. The UE of claim 26, wherein the information further indicates a number of CLI resources associated with CLI measurements of the UE, and
   wherein the number of CLI resources is based at least in part on a first number of transmit beams associated with the UE and a second number of receive beams associated with a second UE associated with the CLI.

29. A method of wireless communication performed by an apparatus of a first network node, comprising:
   receiving, from a user equipment (UE), a cross-link interference (CLI) report;
   determining, based at least in part on the CLI report and on a CLI value being a least CLI value among CLI values indicated in the CLI report, a CLI resource identifier associated with the CLI value; and
   transmitting, to a second network node and based at least in part on the CLI report, CLI information which indicates CLI associated with the UE and which identifies the CLI resource identifier.

30. A method of wireless communication performed by an apparatus of a user equipment (UE), comprising:
   receiving, from a network node, information indicating a time window associated with measurement of at least one cross-link interference (CLI) reference signal;
   receiving the at least one CLI reference signal; and
   transmitting, to the network node, information indicating a time difference between the time window and receipt of the at least one CLI reference signal.

31. The method of claim 30, wherein the information includes at least one CLI reference signal measurement resource configuration for at least one UE that includes the UE.

32. The method of claim 30, wherein the information further indicates a number of CLI resources associated with CLI measurements of the UE, and
   wherein the number of CLI resources is based at least in part on a first number of transmit beams associated with the UE and a second number of receive beams associated with a second UE associated with the CLI.

* * * * *